US012602256B2

(12) United States Patent
Berube et al.

(10) Patent No.: US 12,602,256 B2
(45) Date of Patent: Apr. 14, 2026

(54) PROCESS INVOCATION RESPONSIVE TO CONFIGURATION DEPLOYMENT

(71) Applicant: MICRO FOCUS LLC, Santa Clara, CA (US)

(72) Inventors: Steve Berube, Cambridge, MA (US); Christopher Schleicher, Fort Collins, CO (US); Michael David Oba, Fort Collins, CO (US)

(73) Assignee: Micro Focus LLC, Santa Clara, CA (US)

( * ) Notice: Subject to any disclaimer, the term of this patent is extended or adjusted under 35 U.S.C. 154(b) by 586 days.

(21) Appl. No.: 17/730,573

(22) Filed: Apr. 27, 2022

(65) Prior Publication Data

US 2023/0350725 A1     Nov. 2, 2023

(51) Int. Cl.
  *G06F 9/50*      (2006.01)
  *G06F 9/54*      (2006.01)

(52) U.S. Cl.
  CPC .......... *G06F 9/5044* (2013.01); *G06F 9/5033* (2013.01); *G06F 9/5038* (2013.01); *G06F 9/5077* (2013.01); *G06F 9/542* (2013.01)

(58) Field of Classification Search
  CPC ...... G06F 9/5044; G06F 9/5033; G06F 9/542; G06F 9/5077; G06F 9/5038; G06F 9/45558

USPC .................................................. 718/104, 102
See application file for complete search history.

(56)             References Cited

U.S. PATENT DOCUMENTS

| | | | |
|---|---|---|---|
| 7,203,746 B1* | 4/2007 | Harrop .................. | H04L 43/045 709/224 |
| 7,653,893 B2 | 1/2010 | Neumann | |
| 2015/0358392 A1* | 12/2015 | Ramalingam ......... | H04L 67/131 709/203 |
| 2017/0249374 A1* | 8/2017 | Parees ....................... | G06F 9/44 |
| 2024/0111601 A1* | 4/2024 | Mei .......................... | G06F 8/433 |

* cited by examiner

*Primary Examiner* — April Y Blair
*Assistant Examiner* — Justin Che-Chun Tong
(74) *Attorney, Agent, or Firm* — Sheridan Ross P.C.

(57)             ABSTRACT

A controller system receives from a deployer for a computing resource and into which the controller system has been hooked, a state of the computing resource resulting from deployment of a configuration on the computing resource by a deployment user using the deployer. In response to receiving the state of the computing resource from the deployer, the controller system persists the state within a database. In response to receiving the state of the computing resource from the deployer, the controller system automatically invokes a process previously defined by a process user and maintained by a process system into which the controller system has been hooked, based on the state.

19 Claims, 4 Drawing Sheets

COMPUTER-READABLE DATA STORAGE MEDIUM    200

PROGRAM CODE    202

RECEIVE STATE OF COMPUTING
RESOURCE FROM DEPLOYER    204

PERSIST STATE WITHIN DATABASE    206

AUTOMATICALLY INVOKE PROCESS
MAINTAINED BY PROCESS SYSTEM    208

RECEIVE INDICATION FROM PROCESS
SYSTEM THAT PROCESS HAS CHANGED    210

AUTOMATICALLY REINVOKE PROCESS    212

FIG 3

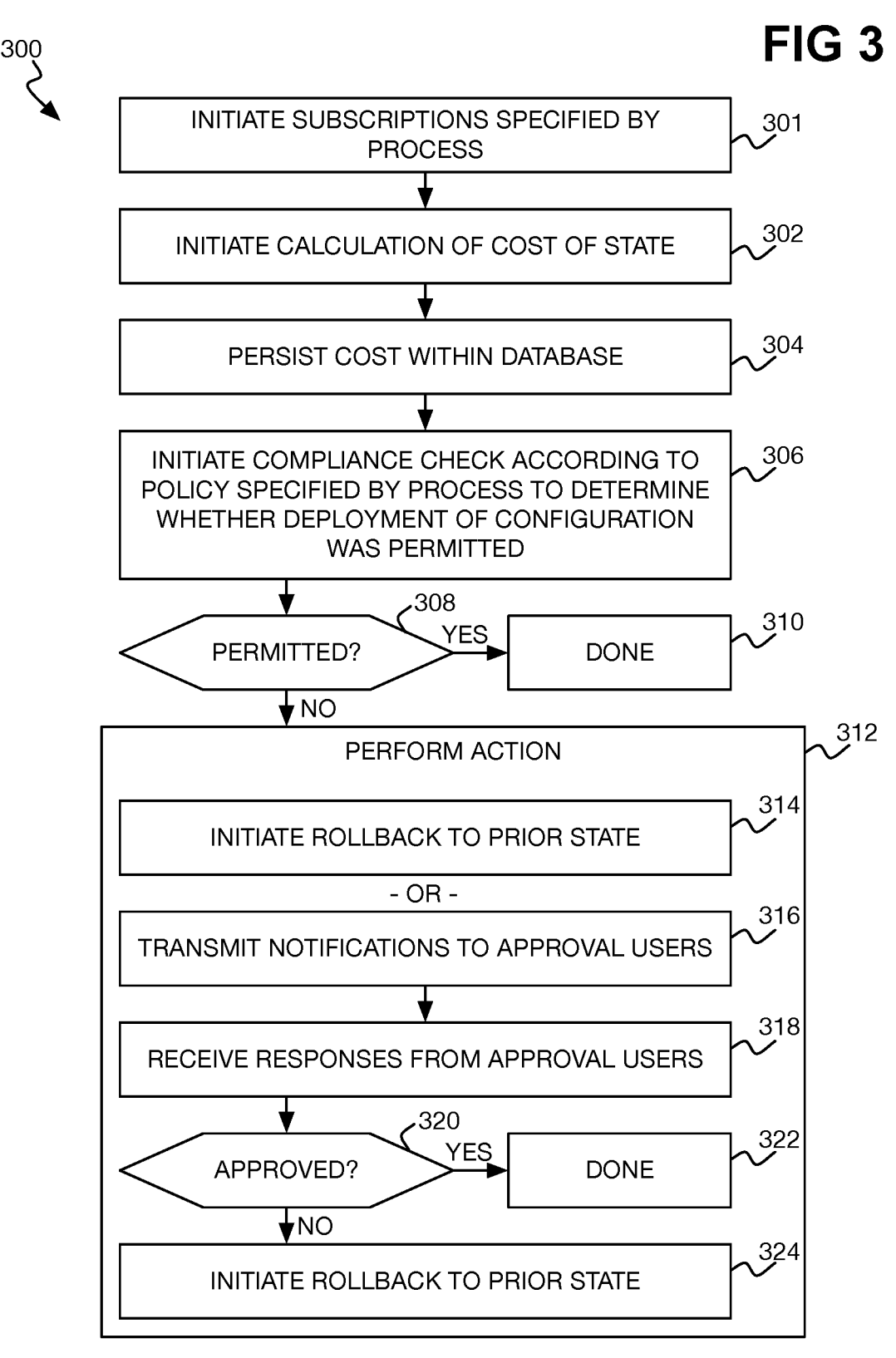

300

INITIATE SUBSCRIPTIONS SPECIFIED BY PROCESS — 301

INITIATE CALCULATION OF COST OF STATE — 302

PERSIST COST WITHIN DATABASE — 304

INITIATE COMPLIANCE CHECK ACCORDING TO POLICY SPECIFIED BY PROCESS TO DETERMINE WHETHER DEPLOYMENT OF CONFIGURATION WAS PERMITTED — 306

308
PERMITTED? —YES→ DONE — 310

NO

PERFORM ACTION — 312

INITIATE ROLLBACK TO PRIOR STATE — 314

- OR -

TRANSMIT NOTIFICATIONS TO APPROVAL USERS — 316

RECEIVE RESPONSES FROM APPROVAL USERS — 318

320
APPROVED? —YES→ DONE — 322

NO

INITIATE ROLLBACK TO PRIOR STATE — 324

400

DEPLOYER — 104

BACKEND SYSTEM     TRIGGER — 402

404

CONTROLLER SYSTEM — 102

COMPUTING RESOURCE STATE — 113

410

DEPLOYER                                                      104

ADDED BACKEND COMPONENT — 412

CONTROLLER SYSTEM — 102

COMPUTING RESOURCE STATE — 113

104

DEPLOYER

EXISTING BACKEND COMPONENT — 422     SIDECAR COMPONENT — 424

CONTROLLER SYSTEM — 102

COMPUTING RESOURCE STATE — 113

420

PROCESS INVOCATION RESPONSIVE TO CONFIGURATION DEPLOYMENT

BACKGROUND

Computing resources include applications and other software, including software containers; hardware and software network resources; other physical hardware such as server and other computing devices; virtual hardware such as virtual machines; and cloud computing resources. Computing resources can also include computing infrastructure, which spans the hardware and software needed to provide services. A configuration can be deployed on a computing resource. A configuration can include a description as to how to create, alter, or update the computing resource, or a description as to an end state resulting from creating, altering, or updating the computing resource. Once a configuration has been deployed on the computing resource, a description of the result is referred to as a state, allowing a representation of and information regarding the result to be stored.

BRIEF DESCRIPTION OF THE DRAWINGS

FIG. 3 is a flowchart of an example method of a process that can be automatically invoked as a result of deployment of a configuration on a computing resource.

DETAILED DESCRIPTION

Figure 1:
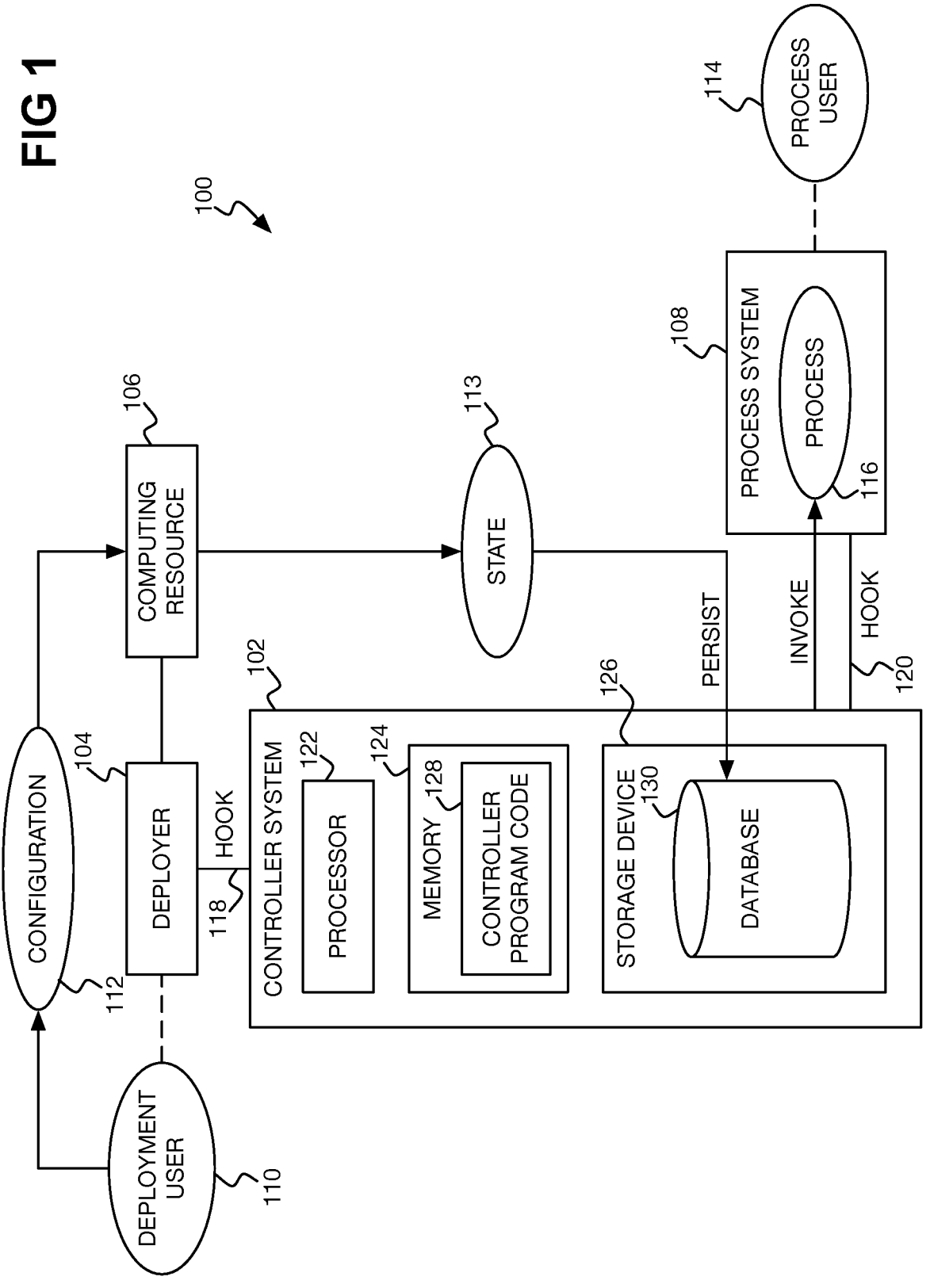
FIG. 1 is a diagram of an example architecture in which a state of a computing resource can upon deployment of a configuration on the computing resource be persisted, and on which basis a process can be automatically invoked.

As noted in the background section, a configuration can be deployed on a computing resource. A configuration may be deployed on a computing resource using deployer program code for the computing resource, which can also be referred to as a deployer. Examples of deployers include Terraform®, which is an opensource infrastructure tool that provides a consistent command line interface (CLI) by which diverse cloud services can be commonly deployed via configurations; and Chef®, which also is an infrastructure tool by which infrastructure and applications can be deployed via configurations, and which is available from Progress Software Corp., of Bedford, Mass.

Other examples of deployers include Puppet®, which is an opensource deployment tool by which multiple application servers can be deployed via configurations; and Ansible®, which is an automation tool by which enterprise infrastructure can be deployed via configurations, and which is available from Red Hat, Inc., of Raleigh, N.C. Another example of a deployer includes CloudSlang®, which is an opensource tool by which computing resources can be deployed via configurations. Other examples of deployers include scripting engines for deploying computing resources via configurations (i.e., for deploying configurations on computing resources).

In general, a user who is interested in deploying a configuration on a computing resource—and who is referred to as a deployment user herein—interacts directly with the deployer for the computing resource. The deployment user via a computing device provides a configuration to the deployer, and may also provide credentials to the deployer that permit the deployment user to deploy the configuration on the computing resource using the deployer. The deployer in turn authenticates the credentials, and if successful, attempts to deploy the configuration on the computing resource. The deployer then returns a response back to the computing device of the deployment user as to whether deployment was successful, and if deployment was successful, can include the state of the computing resource that describes and/or represents the result of the configuration deployment.

The deployment user may be part of an enterprise or other organization that maintains subscriptions for the computing resources by which suitable deployers can deploy configurations on the resources. Another user of the enterprise, who is referred to as a process user herein, may be responsible for promulgating processes, such as business and operational processes, which pertain to the computing resources in whole or in part. The process user may promulgate the processes via a policy system. The processes may, for instance, specify policies governing what types of configurations can be deployed on which types of computing resources. As another example, the processes may specify subscriptions as to which other users should be notified of configuration deployment, and which reports when subsequently generated include the state of the computing resource resulting from the deployment.

The deployment of configurations on computing resources via deployers is divorced from the promulgation of polices via a policy system. While the policies are intended to pertain in whole or in part to the computing resources on which configurations can be deployed on computing resources, the deployers and the policy system do not communicate with one another. This means that policies cannot be automatically invoked (or later reinvoked) based on the state of a computing resource resulting from deployment of a configuration on the computing resource. The policies therefore may not fully or at least timely be able to be put into effect as configurations are deployed on computing resources.

Techniques described herein ameliorate these and other issues. The techniques described herein provide for a controller system that is hooked into both deployers for computing resources and a policy system at which policies pertaining to the computing resources are maintained. When a deployment user interacts with a deployer to deploy a configuration on a computing resource, the controller system receives the resultant state of the computing resource from the deployer due to the controller system having been hooked into the deployer. The controller system can persist the state within a database, and further automatically invoke a process defined by a process user based on the state due to the controller system having been hooked into the process system.

FIG. 1 shows an example architecture 100. The architecture 100 includes a controller system 102, a deployer 104 for a computing resource 106, and a process system 108. The controller system 102 and the process system 108 may each be a computing system implemented as one or multiple computing devices, such as server computing devices. The deployer 104 may be considered as program code that is executed by another computing system which is also made up of one or multiple computing devices.

The controller system 102 and the process system 108 may be maintained by or for the same or different enterprise or other organization or entity. Furthermore, the deployer 104 may be maintained by a different entity than the entity or entities maintaining the systems 102 and 108, such as a third party that provides the deployer 104. Therefore, the entity or entities that maintain the systems 102 and 108 may not be able to modify the program code of the deployer 104. Stated another way, the entity or entities that maintain the systems 102 and 108 may not be privy to the source code of the deployer 104 in order to modify the deployer 104.

A deployment user 110 interacts with the deployer 104 to deploy a configuration 112 on the computing resource 106. For example, the deployment user 110 may via a computing device such as a laptop or desktop computer access the computing system on which the deployer 104 is running to specify the configuration 112 and cause the deployer 104 to then deploy the configuration 112 on the computing resource 106. A state 113 represents and/or describes the result of configuration deployment on the computing resource 106. While one deployer 104 and one computing resource 106 are shown in FIG. 1, there may be multiple computing resources 106 by which configuration deployment is achieved using the same or different deployers 104.

A process user 114 interacts with the process system 108 to define a process 116 that pertains to the computing resource 106. The process user 114 is a different user than the deployment user 110. The process system 108 maintains the process 116. The process 116 may specify one or multiple policies governing configuration deployment on the computing resource 106. The process 116 may specify one or more subscriptions concerning other users to be notified upon configuration deployment, and/or concerning reports that are to include the state 113 when later generated. The process 116 may pertain to multiple computing resources and not just the computing resource 106. Similarly, while one process 116 is shown in FIG. 1, there may be multiple processes 116 that pertain to the same or different computing resources 106.

The controller system 102 is hooked into the deployer 104 via a hook 118, which represents a communicative link permitting the controller system 102 to receive information from the deployer 104. That is, by virtue of being hooked into the deployer 104 via the hook 118, the controller system 102 is able to automatically receive the state 113 of the computing resource 106 when the configuration 112 is deployed on the computing resource 106 by the deployer 104. The state 113 is thus indirectly or directly received from the deployer 104, in a manner that is visible to or not by the deployer 104, such that the deployer 104 may or may not be aware that the controller system 102 is receiving the state 113. Different ways by which the controller system 102 can be hooked into the deployer 104 via the hook 118 are described in detail later in the detailed description. However, how the deployment user 110 interacts with the deployer 104 is unaffected and unchanged by the hook 118.

The controller system 102 is also hooked into the process system 108 via a hook 120, which represents a communicative link permitting the controller system 102 to receive information from the process system 108 and to initiate or invoke actions by or on behalf of the process system 108. The controller system 102 may be hooked into the process system 108 via the hook 120 due to the systems 102 and 108 being maintained by or for the same entity. For example, in the case in which the same entity is responsible for developing and thus is privy to the source code for the controller system 102 and the process system 108, the systems 102 and 108 can be developed to provide for the communicative link between the systems 102 and 108 that is the hook 120. The process system 108 may reveal an applicating programming interface (API), for instance, that the controller system 102 can call, and vice-versa.

The controller system 102 can include a processor 122, a memory 124, and a storage device 126. The memory 124 is an example of a non-transitory computer-readable data storage medium, and stores controller program code 128 that is executed by the processor 122 to perform processing. The storage device 126 may be or include one or multiple hard disk drives, solid-state devices, network-attached storage (NAS), storage-array networks (SANs), and other types of storage devices, and stores a database 130. The controller system 102 persists the state 113 of the computing resource 106 in the database 130 each time the system 102 receives the state 113 from the deployer 104 (i.e., each time configuration deployment occurs on the computing resource 106). On the basis of the received state 113, the controller system 102 can then automatically invoke the process 116 pertaining to the computing resource 106 that is maintained by the process system 108.

Figure 2:
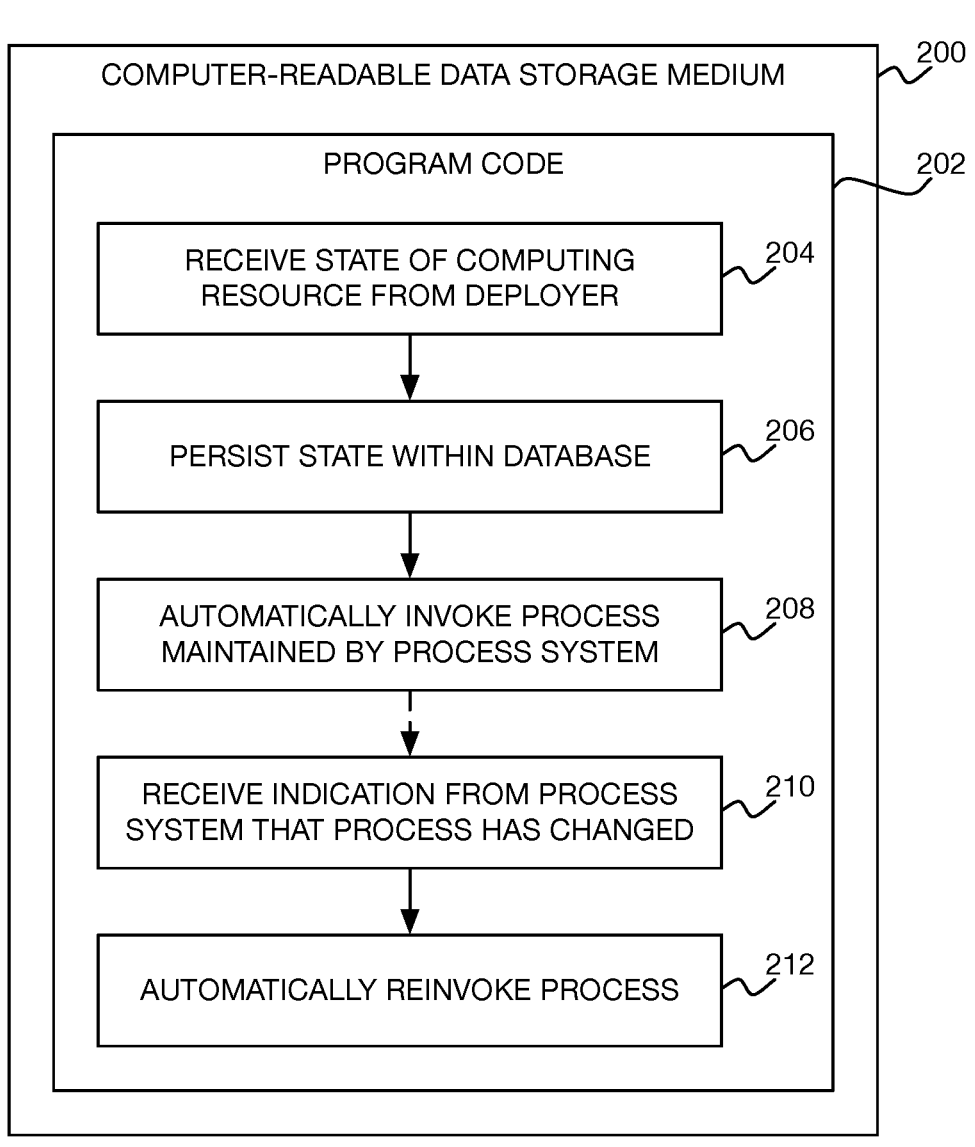
FIG. 2 is a diagram of an example non-transitory computer-readable data storage medium for persisting a state of a computing resource upon deployment of a configuration on the computing resource, and for automatically invoking a process in response.

FIG. 2 shows an example non-transitory computer-readable data storage medium 200 storing program code 202 executable by a processor to perform processing. For example, the computer-readable data storage medium 200 may be the memory 124 of the controller system 102, and the program code 202 may be the controller program code 128. Therefore, the processor 122 of the controller system 102 may execute the program code 202 to perform the processing depicted in the figure.

The processing includes receiving the state 113 of the computing resource 106 resulting from the deployment user 110 interacting with the deployer 104 to cause deployment of the configuration 112 on the computing resource 106 (204). The state 113 is received from the deployer 104 as a result of the controller system 102 having been hooked into the deployer 104 via the hook 118. The processing includes, in response to receiving the state 113 of the computing resource 106 from the deployer 104, persisting the state 113 in the database 130 (206). The state 113 is persisted in the database without overwriting or deleting any prior state 113 of the computing resource 106 that may have been previously persisted in the database 130.

The processing includes, also in response to receiving the state 113 of the computing resource 106 from the deployer 104, invoking the process 116 previously defined by the process user 114 and maintained by the process system 108, based on the state 113 (208). The process 116 is invoked as a result of the controller system 102 having been hooked into the process system 108 via the hook 120. As one example of process invocation, the controller system 102 may call an API of the process system 108, or otherwise communicate with the process system 108, to receive any process 116 that pertains to the computing resource 106 that is the subject matter of the state 113, as identified by the process system 108. Upon receiving each such process 116 from the process system 108, the controller system 102 can then perform the process 116.

As another example of process invocation, the controller system 102 may call an API of the process system 108, or otherwise communicate with the process system 108, to provide the state 113 and an indication of the computing resource 106 that is the subject of the state 113. The process system 108 may then in turn itself identify and perform each process 116 pertaining to the computing resource 106. In this example, then, the process system 108 performs the process 116, whereas in the former example the controller system 102 performs the process 116. In both examples, however, it is the controller system 102 that invokes the process 116, which is provided by the controller system 102 having been hooked into the process system 108 via the hook 120.

The invocation of the process 116 occurs after the configuration 112 has been deployed on the computing resource 106, and in response to the state 113 of the computing resource 106 having been received from the deployer 104. That is, as soon as the state 113 is received, each process 116 that pertains to the computing resource 106 is invoked based on the state 113 of the computing resource 106. This ensures that each such process 116 is timely invoked when configuration deployment has occurred on the computing resource 106. However, the process 116 is not static, and may be changed or updated subsequent to configuration deployment and initial process invocation. Similarly, a new process 116 that pertains to the computing resource 106 may be defined after configuration deployment on the computing resource 106.

The processing can thus include receiving indication from the process system 108 that a process 116 pertaining to the computing resource 106 has changed (210). The indication is received as a result of the controller system 102 having been hooked into the process system 108 via the hook 120. For example, the process system 108 may call an API of the controller system 102, or otherwise communicate with the controller system 102, to notify the controller system 102 of a new or updated process 116. As another example, the controller system 102 may periodically poll the process system 108, via an API or in another manner, to learn of any such new or updated process 116.

The processing includes, in response to receiving such indication of a changed process 116 pertaining to the computing resource 106, automatically reinvoking the process 116 based on the current state 113 of the computing resource 106 as persisted in the database 130 (212). For instance, the controller system 102 may identify to which computing resource 106 the process 116 pertains, and then invoke the process 116 based on the state 113 of the identified computing resource 106. Such automatic process reinvocation occurs after the configuration 112 has been deployed on the computing resource 106, but not in response to the deployment. By comparison, the initial process invocation occurs after and in response to configuration deployment. In the case of a newly defined process 116 that pertains to the computing resource 106, the process 116 is invoked for the first time.

FIG. 3 shows an example method 300 of process invocation (or reinvocation). The method 300 may be performed as a result of process invocation in 208 or process reinvocation in 212, for instance. The method 300 may be performed by the controller system 102 in the case in which the controller system 102 performs the process 116. The method 300 may instead be performed by the process system 108 in the case in which the process system 108 performs the process 116.

The method 300 can include initiating subscriptions specified by the process 116 (301). The subscriptions can include notification subscriptions. Notification subscriptions notify other users of the entity in question of the deployment of the configuration 112 on the computing resource 106 that resulted in the state 113. Therefore, such users are kept informed of configuration deployments in accordance with the defined process 116.

The subscriptions can in addition or instead include reporting subscriptions. Reporting subscriptions cause the state 113 of the computing resource 106 resulting from deployment of the configuration 112 on the computing resource 106 to be included in future reports that may be generated. For example, reports concerning the resources of the entity in question, including the computing resource 106, may be periodically generated. For accurate reports to be generated, such generation has to be based on the current state 113 of the computing resource 106. Therefore, reporting subscriptions store the state 113 in such a way that when a subscribing report is generated, the state 113 is used during report generation.

The method 300 can include initiating calculation of the cost of the state 113 of the computing resource 106 resulting from deployment of the configuration 112 on the computing resource 106 (302), and persisting the calculated cost in the database 130 (304). The calculated cost may be the current monetary or other cost associated with actual deployment of the configuration 112 on the computing resource 106. The calculated cost may in addition or instead be the projected future (i.e., lifetime) monetary or other cost resulting from the state 113 of the computing resource 106 that deployment of the configuration 112 on the computing resource 106 effected. In one implementation, the described reporting subscriptions can include the calculated cost.

The method 300 can include initiating a compliance check according to a policy specified by the process 116 to determine whether deployment of the configuration 112 on the computing resource 106 was permitted (306). The compliance check can be based on the state 113 of the computing resource 106 resulting from configuration deployment. For example, the policy may specify, based on the state 113, that just certain deployment users 110 are permitted to deploy configurations 112 on certain computing resources 106, and/or that just certain configurations 112 are permitted to be deployed on the resources 106.

The compliance check can also or instead be based on the calculated cost of the state 113 of the computing resource 106 resulting from configuration deployment. For example, the policy may specify that the actual cost of configuration deployment on the computing resource 106 that resulted in the state 113 cannot exceed a threshold. As another example, the policy may specify that the projected lifetime cost of the state 113 of the computing resource 106 that resulted from configuration deployment cannot exceed a threshold. Such a policy may be entity-wide, or be particular to the deployment user 110 or a type of (or user group including) the deployment user 110.

In response to determining that the deployment of the configuration 112 on the computing resource 106 resulting in the state 113 is permissible (308), the method 300 may be finished (310). However, if configuration deployment is not permissible, the method 300 may include performing an action (312). Two example types of examples are described. First, the performed action can include initiating rollback to a prior state 113 of the computing resource 106 as previously persisted in the database 130 (314). For instance, as a result of the controller system 102 having been hooked into the deployer 104 via the hook 118, the controller system 102 may itself be able to deploy a configuration 112 on the computing resource 106 via the deployer 104. The controller system 102 uses the deployer 104 to deploy a configuration 112 on the computing resource 106 that rolls the computing resource 106 back to the prior state 113 in question.

As another example of the action that can be performed, rollback of the computing resource 106 to a prior state 113 may not be automatically performed, and may not be performed at all. Instead, notifications may be transmitted to one or multiple approval users requesting approval or disapproval of the deployment of the configuration 112 on the computing resource 106 that resulted in the state 113 (316). The approval users may be delineated in the policy specified by the process 116. Approval responses and/or disapproval responses may then be received from these users (318). Approval responses indicate that configuration deployment is permissible even though the deployment failed the compliance check. Disapproval responses affirm that the configuration deployment is indeed not to be permitted.

If the approval users approved the deployment of the configuration 112 on the computing resource 106 that resulted in the state 113 and that nevertheless failed the compliance check (320), then the method 300 may be finished with the deployed configuration 112 remaining in place (322). However, if the approval users disapproved of configuration deployment, then rollback of the computing resource 106 to a prior state 113 as previously persisted in the database 130 may be initiated (324). If there are multiple approval users, all approval users may have to consent to configuration deployment for the deployment to be approved, or all the approval users from whom responses have been received may have to provide such consent. In another implementation, a threshold percentage of all approval users or a threshold percentage of the approval users from which responses have been received may have to provide sent.

Figures 4A, 4B, 4C:
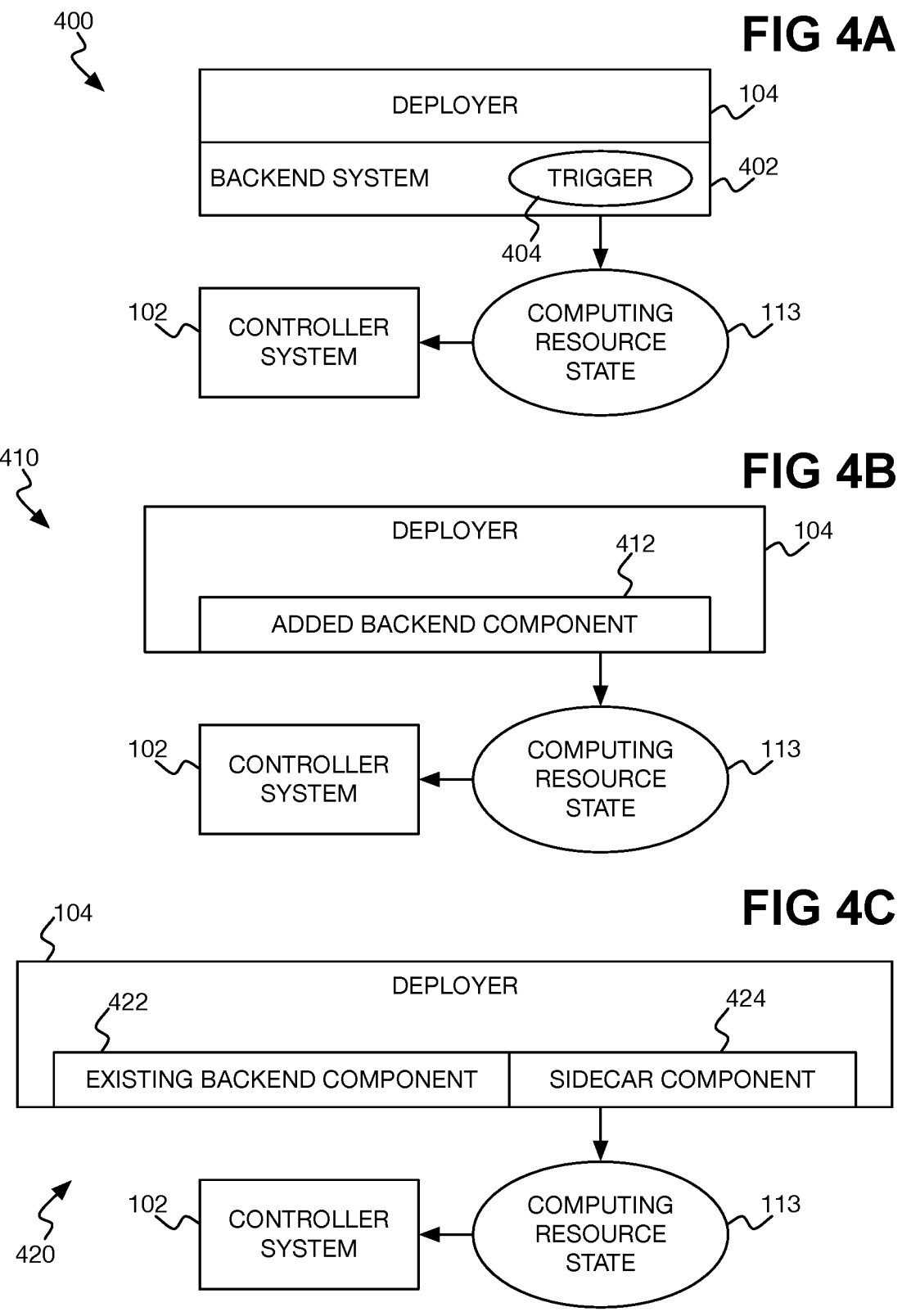
FIGS. 4A, 4B, and 4C are diagrams of different models by which a controller system can be hooked into a deployer for a computing resource.

FIGS. 4A, 4B, and 4C show different example models 400, 410, and 420, respectively, by which controller system 102 may be hooked into the deployer 104 via the hook 118. FIG. 4A shows a reaction model 400. In the reaction model 400, the deployer 104 is implemented on a backend system 402 that provides trigger capability. Therefore, a trigger 404 is defined to cause the state 113 of the computing resource 106 to be automatically transmitted to the controller system 102 from the backend system 402 upon deployment configuration. For example, the Amazon Simple Storage Service (S3)® available from Amazon.com, Inc., of Seattle, Wash., includes an Amazon Web Services (AWS)® Lamba computing platform that provides a backend system 402 which can employ such a trigger 404 in conjunction with a deployer 104. The model 400 is a reaction model in that the trigger 404 causes a reaction of the backend system 402 to the state 113 (i.e., the transmission of the state 113), in a manner transparent to the deployer 104.

FIG. 4B shows a first class model 410. In the first class model 410, the deployer 104 may have the capability to include a configurable state backend, such as a hypertext transport protocol (HTTP) backend, but may not have any such backend component 412 currently configured. Therefore, a backend component 412 can be added by or for the controller system 102. Upon being so added or configured, the backend component 412 automatically pushes the state 113 of the computing resource 106, as received from the deployer 104, to the controller system 102 upon configuration deployment. An example of a deployer in which such a backend component 412 can be installed is the Terraform® tool noted above. The model 410 is a first class model in that the controller system 102 is the first or only configurator of the backend component 412, and therefore directly receives the state 113 from the deployer 104 via the backend component 412.

FIG. 4C shows a sidecar model 420. In the sidecar model 420, the deployer 104 may again have the capability to include a configurable state backend, such as an HTTP backend, and may already have such an existing backend component 422 added or configured by a system other than the controller system 102. Therefore, the backend component 422 directly receives the state 113 of the computing resource 106 from the deployer 104 upon configuration deployment. However, the controller system 102 is able to add a sidecar component 424 that is secondary to the existing backend component 422. Upon receipt of the state 113 from the deployer 104, the primary, existing backend component 422 provides the state 113 to the sidecar component 424, which then pushes the state 113 to the controller system 102. An example of a deployer in which such a sidecar component 424 can be installed in conjunction with an existing backend component 422 is the Terraform® tool noted above. The model 420 is a sidecar model in that the controller system 102 configures a sidecar component 424 after a backend component 422 has already been configured, and therefore receives the state 113 indirectly from the deployer 104, via the existing backend component 422 providing the state 113 to the sidecar component 424.

Techniques have been described herein for automatic state persistence and automatic process invocation responsive to configuration deployment. A controller system 102 hooks into a deployer 104 to automatically receive the state 113 of the computing resource 106 when a configuration 112 has been deployed on the computing resource 106. The controller system 102 also hooks into a process system 102 to automatically invoke a process 116 when configuration deployment has occurred, and to reinvoke the process 116 upon process change.

We claim:
1. A non-transitory computer-readable data storage medium storing program code executable by a controller system to perform processing comprising:

receiving, by the controller system and from a deployer for a computing resource and into which the controller system has been hooked, a state of the computing resource resulting from a deployment of a configuration on the computing resource by a deployment user using the deployer, wherein the deployer deploys the configuration on the computing resource without interaction with the controller system, wherein the deployment of the configuration on the computing resource is disassociated from promulgation of a policy specified by a process previously defined by a process user and maintained by a process system into which the controller system has also been hooked, wherein the deployer, the process system, and the controller system are each discrete and different from one another, and the process user and the deployment user are different users, wherein the policy pertains to which configurations are permissible for deployment on the computing resource, and the configuration deployed on the computing resource using the deployer is not permitted by the policy; and in response to the controller system receiving the state of the computing resource from the deployer, persisting, by the controller system, the state within a database maintained by the controller system, and automatically invoking the process based on the state, based on the state, wherein automatically invoking the process comprises:

initiating a compliance check according to the policy to determine that the deployment of the configuration on the computing resource is not permitted; and in response to determining that the deployment of the configuration on the computing resource is not permitted, initiating rollback of the computing resource to a prior state of the computing resource previously persisted within the database, wherein hooking of the controller system into both the deployer and the process system ensures that, as a result of the controller system initiating rollback of the computing resource to the prior state, the configuration is ultimately not deployed on the computing resource, even though the deployment of the configuration on the computing resource is otherwise disassociated from promulgation of the policy since the deployer and the process system do not communicate with one another.

2. The non-transitory computer-readable data storage medium of claim 1, wherein automatically invoking the process further comprises:

initiating one or more subscriptions specified by the process to the state, wherein the subscriptions comprise either or both of:

notification subscriptions to notify other users of the deployment of the configuration on the computing resource resulting in the state; and reporting subscriptions to cause the state of the computing resource resulting from the deployment of the configuration to be included in future reports.

3. The non-transitory computer-readable data storage medium of claim 1, wherein automatically invoking the process further comprises:

initiating calculation of a cost of the state of the computing resource resulting from the deployment of the configuration; and persisting the cost of the state of the computing resource within the database.

4. The non-transitory computer-readable data storage medium of claim 3, wherein automatically invoking the process further comprises:

initiating the compliance check according to the policy specified by the process to determine whether the deployment of the configuration on the computing resource was permitted, based on the cost of the state of the computing resource resulting from the deployment of the configuration.

5. The non-transitory computer-readable data storage medium of claim 1, wherein the processing further comprises:

in response to receiving, from the process system into which the controller system has been hooked, an indication that the process has changed, automatically reinvoking the process based on the state.

6. The non-transitory computer-readable data storage medium of claim 5, wherein automatically reinvoking the process based on the state comprises:

initiating the compliance check according to the policy specified by the process and that has been updated since the deployment of the configuration on the computing resource, to determine whether the deployment was permitted, based on the state.

7. The non-transitory computer-readable data storage medium of claim 1, wherein the controller system is hooked into the deployer such that how the deployment user interacts with the deployer to deploy the configuration on the computing resource is unchanged.

8. A computing system comprising:

a storage device storing a database;

a processor; and a memory storing controller program code that has been hooked into a deployer for a computing resource and into a process system maintaining a process that has been previously defined by a process user and that pertains to the computing resource, and that is executable by the processor to:

receive, by the controller program code from the deployer due to the controller program code having been hooked into the deployer, a state of the computing resource resulting from a deployment of a configuration on the computing resource by a deployment user using the deployer, wherein the deployer deploys the configuration on the computing resource without interaction with a controller system, wherein the deployment of the configuration on the computing resource is disassociated from promulgation of a policy specified by the process, wherein the deployer, the process system, and the controller system are each discrete and different from one another, and the process user and the deployment user are different users, wherein the policy pertains to which configurations are permissible for deployment on the computing resource, and the configuration deployed on the computing resource using the deployer is not permitted by the policy; and in response to the controller program code receiving the state of the computing resource from the deployer, persist the state within the database maintained by the controller program code, and automatically invoke the process based on the state, wherein the controller program code is executable by the processor to automatically invoke the process based on the state by:

initiating a compliance check according to the policy specified by the process to determine that the deployment of the configuration on the computing resource is not permitted; and in response to determining that the deployment of the configuration on the computing resource is not permitted, initiating rollback of the computing resource to a prior state of the computing resource previously persisted within the database, wherein hooking of the controller system into both the deployer and the process system ensures that, as a result of the controller system initiating rollback of the computing resource to the prior state, the configuration is ultimately not deployed on the computing resource, even though the deployment of the configuration on the computing resource is otherwise disassociated from promulgation of the policy since the deployer and the process system do not communicate with one another.

9. The computing system of claim 8, wherein the controller program code is hooked into the deployer in a reaction model that employs a trigger that causes the state resulting from the deployment of the configuration on the computing resource to be automatically transmitted to the controller program code from a backend system on which the deployer is implemented, and wherein automatic transmission of the state to the controller program code is transparent to the deployer.

10. The computing system of claim 8, wherein the controller program code is hooked into the deployer in a first class model by which the deployer does not have an existing backend component and a backend component is added to the deployer to cause the deployer to automatically push the state resulting from the deployment of the configuration on the computing resource to the controller program code.

11. The computing system of claim 8, wherein the controller program code is hooked into the deployer in a sidecar model by which the deployer has an existing backend component that receives the state resulting from the deployment on the computing resource, and by which a sidecar component is added to the existing backend component to additionally push the state to the controller program code.

12. The computing system of claim 8, wherein the controller program code is executable by the processor to automatically invoke the process by further:

initiating one or multiple notification subscriptions to notify process-specified users of the deployment of the configuration on the computing resource resulting in the state; and initiating one or multiple reporting subscriptions to cause the state of the computing resource resulting from the deployment of the configuration to be included in future reports.

13. The computing system of claim 8, wherein the controller program code is executable by the processor to automatically invoke the process by:

initiating calculation of a cost of the state of the computing resource resulting from the deployment of the configuration;

persisting the cost of the state of the computing resource within the database; and initiating the compliance check according to the policy specified by the process to determine whether the deployment of the configuration on the computing resource was permitted, based on the cost of the state of the computing resource resulting from the deployment of the configuration.

14. The computing system of claim 8, wherein the controller program code is executable by the processor to further:

receive, from the process system due to the controller program code having been hooked into the process system, an indication that the process has been changed; and in response to receiving the indication that the process has been changed, automatically reinvoke the process based on the state.

15. A method comprising:

receiving, by a controller system from a deployer for a computing resource and into which the controller system has been hooked, a state of the computing resource resulting from a deployment of a configuration on the computing resource by a deployment user using the deployer, wherein the deployer deploys the configuration on the computing resource without interaction with the controller system, wherein the deployment of the configuration on the computing resource is disassociated from promulgation of a policy specified by a process previously defined by a process user and maintained by a process system into which the controller system has also been hooked, wherein the deployer, the process system, and the controller system are each discrete and different from one another, and the process user and the deployment user are different users,

wherein the policy pertains to which configurations are permissible for deployment on the computing resource, and the configuration deployed on the computing resource using the deployer is not permitted by the policy; and in response to the controller system receiving the state, persisting, by the controller system, the state within a database maintained by the controller system, and automatically invoking, the process based on the state, wherein automatically invoking the process comprises:

initiating a compliance check according to the policy to determine that the deployment of the configuration on the computing resource is not permitted; and in response to determining that the deployment of the configuration on the computing resource is not permitted, initiating rollback of the computing resource to a prior state of the computing resource previously persisted within the database, wherein hooking of the controller system into both the deployer and the process system ensures that, as a result of the controller system initiating rollback of the computing resource to the prior state, the configuration is ultimately not deployed on the computing resource, even though the deployment of the configuration on the computing resource is otherwise disassociated from promulgation of the policy since the deployer and the process system do not communicate with one another.

16. The method of claim 15, further comprising:

in response to receiving, by the controller system from the process system into which the controller system has been hooked, an indication that the process has been changed, automatically reinvoking, by the controller system, the process based on the state, wherein automatic reinvocation of the process includes reinitiation of the compliance check according to the policy specified by the process and that has been updated since the deployment of the configuration on the computing resource, to determine whether the deployment was permitted, based on the state.

17. The non-transitory computer-readable data storage medium of claim 1, wherein the controller system is hooked into the deployer in a reaction model that employs a trigger that causes the state resulting from the deployment of the configuration on the computing resource to be automatically transmitted to the controller system from a backend system on which the deployer is implemented, and wherein automatic transmission of the state to the controller system is transparent to the deployer.

18. The non-transitory computer-readable data storage medium of claim 1, wherein the controller system is hooked into the deployer in a first class model by which the deployer does not have an existing backend component and a backend component is added to the deployer to cause the deployer to automatically push the state resulting from the deployment of the configuration on the computing resource to the controller system.

19. The non-transitory computer-readable data storage medium of claim 1, wherein the controller system is hooked into the deployer in a sidecar model by which the deployer has an existing backend component that receives the state resulting from the deployment on the computing resource, and by which a sidecar component is added to the existing backend component to additionally push the state to the controller system.

* * * * *